Patented Dec. 5, 1950

2,533,170

UNITED STATES PATENT OFFICE 2,533,170

VAT DYES OF THE ANTHRIMIDE CARBAZOLE THIOXANTHONE TYPE

Fritz Max, Staten Island, N. Y., and David I. Randall, Phillipsburg, N. J., assignors to General Aniline & Film Corporation, New York, N. Y., a corporation of Delaware No Drawing. Original application November 16, 1945, Serial No. 629,196. Divided and this application March 18, 1948, Serial No. 15,718

4 Claims. (Cl. 260—316)

The present invention relates to the preparation of vat dyes of the anthraquinone series and particularly to dyes of the anthrimide carbazole thioxanthone type.

This application is a division of our application Serial No. 629,196, filed November 16, 1945, now abandoned, entitled "Vat Dyes of the Anthrimide Carbazole Thioxanthone Type."

Phthaloyl-thioxanthone has the following structural formula:

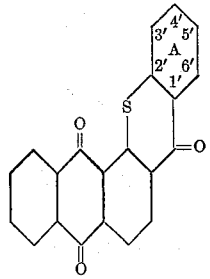

Said compound and its derivatives, particularly those in which the benzo radical marked with the letter A in the above formula bears substituent groups, such as chlorine and the like, are described in the literature, and in this connection reference is made to page 555 of "Das Anthracen und die Anthrachinone" by J. Houben, page 603 of "Künstliche Organische Farbstoffe" by H. E. Fierz-David, and German Patent 243,750. These compounds, however, have little or no utility as dyestuffs because they are weakly colored and have very little affinity for textile fibers. This is borne out by German Patents 243,587 and 231,854. In an effort to overcome such defects in said compounds, it has been proposed to react the compounds with anthraquinones. For instance, in German Patent 231,854, 1-amino-5.6-anthraquinone thioxanthone is condensed with α-chloranthraquinone, whereby the amino group in the 1-position of the thioxanthone is substituted by an anthraquinone molecule. It is pointed out in the corresponding U. S. P. 999,785 that these compounds dye cotton in shades ranging from red to grayish blue.

We have now discovered that vat dyes capable of dyeing vegetable fibers in shades ranging from orange to red brown are obtained by condensing a 1-amino-anthraquinone with an anthraquinone-thioxanthone while insuring the presence in the 6' position of the thioxanthone of a chlorine atom to thereby link the amino-anthraquinone to said thioxanthone in this position. By subsequent treatment of such anthraquinonyl derivative, ring closure ensues with the formation of a carbazole derivative. Such compounds and their use for dyeing textile fibers constitute the purposes and objects of the present invention.

The compounds which are embraced by our invention may be typified by the following structural formula:

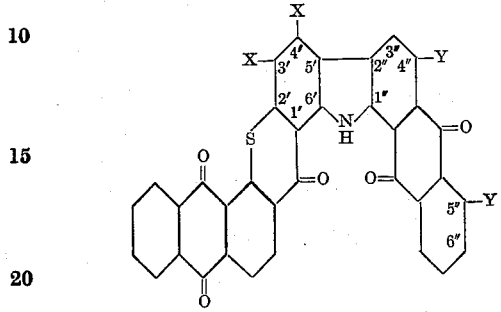

In this formula, X may be hydrogen, halogen, such as chlorine, bromine, or the like; alkyl, such as methyl, ethyl, propyl, butyl, amyl, octyl, stearyl and the like; aryloxy, such as phenoxy, toluyloxy, chlorphenoxy, naphthoxy and the like, or alkoxy, such as methoxy, ethoxy, propoxy, butoxy, amyloxy, octyloxy, stearyloxy and the like. Y, on the other hand, may be hydrogen, alkoxy as above, amino or a benzoyl amino radical. The phenyl ring of the benzoyl amino radical may be substituted by halogen, alkyl, aryloxy, alkoxy as above, or amino such as primary amino, secondary amino, i. e., alkyl amino, such as methyl amino, ethyl amino, butyl amino, amyl amino, octyl amino, stearyl amino and the like; aryl amino, such as phenyl amino, naphthyl amino and the like; or tertiary amino such as dialkyl amino in which the alkyl groups are as above, diaryl amino in which the aryl groups are as above, or alkyl-aryl amino in which the alkyl and aryl groups are as above, carboxy, sulfo and the like. The amino value for Y may be primary, secondary or tertiary as above.

Compounds typified by the formula are prepared by condensing an anthraquinone 2.1-(S)-1'.2'-(S)-6'-chlorothioxanthone which may contain the appropriate substituents in the 3' and 4' positions, as previously noted, with a 1-amino anthraquinone suitably substituted, if desired, in the 4- and 5-positions (corresponding to the 4''- and 5''-positions of the final product), the reactants being employed in substantially equimolar proportions. The condensation is effected by heating the reactants to a temperature ranging between 190° C.–250° C. in the presence of an acid acceptor, such as soda ash, sodium acetate, potassium carbonate, and the like, and copper or a copper salt such as copper acetate and the like.

The intermediate anthrimide thus obtained is ring-closed by heating the same to a temperature ranging from about 50°–125° C. in the presence of a condensing agent, such as concentrated sulfuric acid, chlorsulfonic acid, or a metal chloride in the presence of a non-basic organic solvent. The metal chlorides are preferably aluminum chloride and ferric chloride. Examples of the non-basic organic solvents are nitro-benzene, nitro-toluene, dinitrobenzene, tetrachlorethane, chlorobenzene, and the like.

The anthraquinone-thioxanthone with which the 1-amino anthraquinones are reacted is made by reacting a 1-halogen- or a 1-nitro-anthraquinone-2-carboxylic acid with a phenyl mercaptan bearing the desired substituents in the 2- and 3-positions (corresponding to the 3'- and 4'-positions of the final product) and a halogen atom, preferably a chlorine atom, in the 5-position (corresponding to the 6'-position in the final product). The method of producing these compounds is disclosed in detail in German Patent 243,750.

Examples of compounds contemplated by the present invention are listed below. For the sake of brevity, the nomenclature subsequently used indicates the particular substituents in the following formula:

(1)

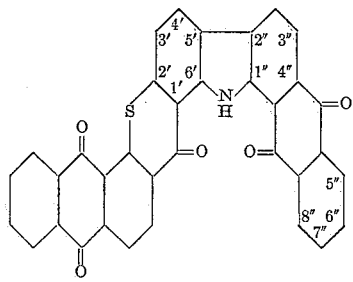

(2) This compound is the same as that of the above formula excepting that the 3'-position is substituted by chlorine and the 4''-position by benzoyl amino.

(3) This compound is the same as that of the above formula excepting that the 3'-position is substituted by chlorine and the 5''-position by benzoyl amino.

(4) This compound is the same as that of the above formula excepting that the 3'-position is substituted by chlorine and the 5''-position by primary amino.

(5) This compound is the same as that of the above formula excepting that the 3'-position is substituted by methyl and the 4''-position by benzoyl amino.

(6) This compound is the same as that of the above formula excepting that the 3'-position is substituted by methyl.

(7) This compound is the same as that of the above formula excepting that the 4'-position is substituted by chlorine and the 5''-position by methoxy.

(8) This compound is the same as that of the above formula excepting that the 3'-position is substituted by methoxy and the 4''-position by p-chlorobenzoyl amino.

(9) This compound is the same as that of the above formula excepting that the 3'-position is substituted by phenoxy and the 5''-position by ethoxy.

(10) This compound is the same as that of the above formula excepting that the 3'-position is substituted by bromine and the 5''-position by toluoyl amino.

The following examples will serve to illustrate the invention, but it is to be understood that the same is not restricted thereto. The parts unless otherwise stated are parts by weight.

Example I 29 parts of anthraquinone 2.1-(S)-1'.2'-(S)-3'.6'-dichlorothioxanthone, 24.9 parts of 1-amino-4-benzoyl amino anthraquinone, 27.6 parts of soda ash, 3.4 parts of copper acetate, and 420 parts of nitrobenzene are heated at 210° C. for 5 hours. After cooling the reaction mixture to 25° C., the dark, crystalline condensation product is filtered off and washed with alcohol, water, and dilute hydrochloric acid. The yield is almost quantitative. This anthrimide dyes cotton in gray shades from a violet hydrosulfite vat.

48.5 parts of said anthrimide are added to 820 parts of 100% sulfuric acid, whereupon the solution is heated at 74°–79° C. for 50 minutes. The color of the solution changes from brown to violet. It is poured into ice and water and the precipitated dyestuff is isolated by filtration. The dye may be brightened by treating the same with an acid dichromate solution. Cotton is dyed from a violet hydrosulfite vat by this product in bright burnt orange shades of excellent fastness properties. The dichlorothioxanthone which is condensed with the 1-amino anthraquinone hereinabove is gold-yellow in color but it has very little affinity for cotton.

Example II 8.4 parts of anthraquinone 2.1-(S)-1'.2'-(S)-3'.6'-dichlorothioxanthone, 7.2 parts of 1-amino-5-benzoyl amino anthraquinone, 8 parts of soda ash, 1 part of copper acetate, and 120 parts of nitrobenzene are heated at 210° C. for 5 hours while stirring. Upon cooling the reaction mixture to 25° C., the violet crystals present are filtered, washed with ethanol, dilute hydrochloric acid and water. This anthrimide dyes cotton from a hydrosulfite vat in dull gray shades.

The anthrimide thus obtained is treated in the same way as in Example I. The finished dyestuff after treatment with an acid dichromate solution in order to brighten the same is an orange-brown powder which dyes cotton from a hydrosulfite vat in orange shades of excellent fastness properties.

The thioxanthone employed as a parent material is prepared by condensing 1-nitro-2-anthraquinone carboxylic acid with 2.5-dichlorothiophenol followed by ring closure to said thioxanthone.

Example III 12 parts of anthraquinone 2.1-(S)-1'.2'-(S)-3'-methyl-6'-chlorothioxanthone, 11.5 parts of 1-amino-4-benzoyl amino anthraquinone, 8 parts of soda ash, 1 part of copper acetate, and 120 parts of nitrobenzene are heated at 210° C. for 5 hours. After cooling to 30° C., the dark crystalline anthrimide is filtered and washed with ethanol, dilute hydrochloric acid, and water.

For carbazolation, the procedure of Example I is used. A brown powder is obtained which dyes cotton from a hydrosulfite vat in red-brown shades of good fastness properties.

Example IV 12 parts of anthraquinone 2.1-(S)-1'.2'-(S)-3'-methyl-6'-chlorothioxanthone, 11 parts of 1-amino anthraquinone, 8 parts of soda ash, 1 part of copper acetate, and 120 parts of nitrobenzene are heated at 210° C. for 5 hours. The reaction mixture is cooled, filtered, and the filter cake washed with ethanol and hot water.

9.3 parts of the above anthrimide are dissolved in a solution of 35 parts of anhydrous aluminum chloride in 120 parts of nitrobenzene. Upon stirring for 1 to 5 hours at 95°–100° C., the solution is poured into water containing hydrochloric acid and the nitrobenzene is removed by steam distillation. The crude dyestuff is then filtered off.

Cotton is dyed by the finished dyestuff in orange-brown shades of good fastness properties.

The dyes of the present invention show especially good fastness to chlorine and light. They are suitable for printing fabrics by the usual methods.

Various modifications of the invention will occur to persons skilled in the art and we therefore do not intend to be limited in the patent granted except as required by the prior art and the appended claims.

We claim:

1. Vat dyes capable of dyeing textile fibers orange to red-brown shades of excellent fastness properties and being of the following constitution:

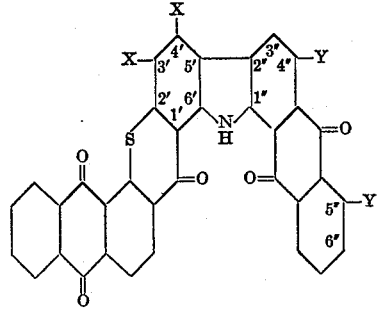

in which X is a member of the class consisting of hydrogen, halogen, alkyl, aryloxy, alkoxy, and Y is a member of the class consisting of hydrogen, alkoxy, amino, and a benzoyl amino radical.

2. The compound

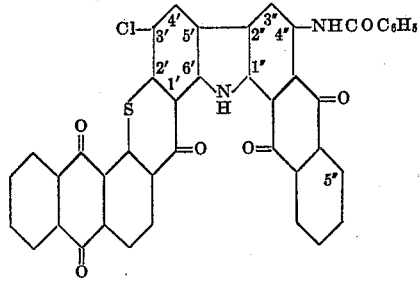

which dyes cotton from a violet hydrosulfite bath burnt orange shades of excellent fastness properties.

3. The compound

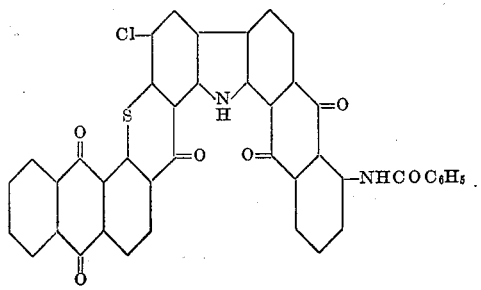

which dyes cotton from a violet hydrosulfite bath orange shades of excellent fastness properties.

4. The compound

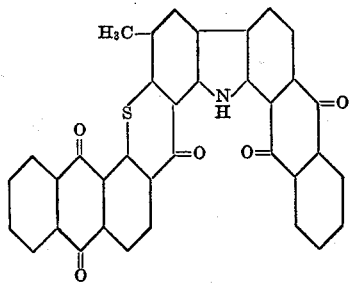

which dyes cotton from a hydrosulfite vat in orange-brown shades of good fastness properties.

FRITZ MAX.
DAVID I. RANDALL.

REFERENCES CITED

The following references are of record in the file of this patent:

UNITED STATES PATENTS

| Number | Name | Date |
|---|---|---|
| 2,086,843 | Bauer | July 13, 1937 |
| 2,212,965 | Wieners et al. | Aug. 27, 1940 |
| 2,344,981 | Dettwyler | Mar. 28, 1944 |

FOREIGN PATENTS

| Number | Country | Date |
|---|---|---|
| 231,854 | Germany | Feb. 28, 1911 |
| 264,042 | Germany | Sept. 10, 1913 |